United States Patent
Attig et al.

(10) Patent No.: US 8,385,340 B1
(45) Date of Patent: Feb. 26, 2013

(54) PIPELINE OF A PACKET PROCESSOR PROGRAMMED TO CONCURRENTLY PERFORM OPERATIONS

(75) Inventors: Michael E. Attig, San Jose, CA (US); Gordon J. Brebner, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 288 days.

(21) Appl. No.: 12/858,418

(22) Filed: Aug. 17, 2010

(51) Int. Cl.
*H04L 12/56* (2006.01)
(52) U.S. Cl. ............. 370/390; 370/411; 716/18; 341/79
(58) Field of Classification Search .................... 341/79; 716/18; 370/390, 411
See application file for complete search history.

(56) References Cited

U.S. PATENT DOCUMENTS

| | | | |
|---|---|---|---|
| 6,081,212 A * | 6/2000 | Tagato et al. .................... | 341/79 |
| 6,665,725 B1 * | 12/2003 | Dietz et al. ..................... | 709/230 |
| 7,398,502 B1 * | 7/2008 | Kulkarni et al. .............. | 716/111 |
| 7,636,908 B1 | 12/2009 | Brebner | |
| 7,669,166 B1 | 2/2010 | Brebner | |
| 7,784,014 B1 | 8/2010 | Brebner et al. | |
| 2009/0177876 A1 * | 7/2009 | Wang et al. ........................ | 713/1 |
| 2010/0070257 A1 * | 3/2010 | Mylavarapu et al. ........... | 703/16 |

OTHER PUBLICATIONS

Shiro et al., "A processor Generation method from instruction behavior description based on specification of pipeline stages and functional units" 2007, pp. 286-291, IEEE computer society, whashington dc. U.S.A.*

U.S. Appl. No. 11/818,788, filed Jun. 14, 2007, Attig, Michael E. and Brebner, Gordon J., Xilinx, Inc. 2100 Logic Drive, San Jose, CA USA.
U.S. Appl. No. 11/818,811, filed Jun. 14, 2007, Attig, Michael E. and Brebner, Gordon J., Xilinx, Inc. 2100 Logic Drive, San Jose, CA USA.
U.S. Appl. No. 11/799,860, filed May 3, 2007, Keller, Eric R. and James-Roxby, Philip B., Xilinx, Inc. 2100 Logic Drive, San Jose, CA USA.
U.S. Appl. No. 11/799,953, filed May 3, 2007, James-Roxby, Philip B. and Keller, Eric R. Xilinx, Inc. 2100 Logic Drive, San Jose, CA USA.
U.S. Appl. No. 11/799,966, filed May 3, 2007, Keller et al., Xilinx, Inc. 2100 Logic Drive, San Jose, CA USA.
U.S. Appl. No. 11/799,898, filed May 3, 2007, Keller et al. Xilinx, Inc. 2100 Logic Drive, San Jose, CA USA.

* cited by examiner

*Primary Examiner* — Dang Ton
*Assistant Examiner* — Mewale Ambaye
(74) *Attorney, Agent, or Firm* — LeRoy D. Maunu; Gerald Chan (57) ABSTRACT

A packet processor includes a memory and a programmable compute pipeline. The memory stores microcode that specifies respective sets for the packet types, and the respective set for each type specifies elementary operations for each stage except an initial stage of the programmable compute pipeline. The programmable compute pipeline includes a sequence of stages beginning with the initial stage. The initial stage includes an operation selector that selects the respective set for the type of each packet. Each stage except the initial stage includes elementary components that are programmable to concurrently perform each of multiple combinations of elementary operations. The elementary components concurrently perform a selected one of the combinations for each packet. The selected combination includes the elementary operations specified for the stage in the respective set that the operation selector selects for the packet's type.

20 Claims, 8 Drawing Sheets

FIG. 8

PIPELINE OF A PACKET PROCESSOR PROGRAMMED TO CONCURRENTLY PERFORM OPERATIONS

FIELD OF THE INVENTION

One or more embodiments of the invention generally relate to communication protocols, and more particularly to packet processors for manipulating data packets.

BACKGROUND

A network packet processor may input a stream of network packets, manipulate the contents of the network packets, and output another stream of modified network packets. The manipulations may implement a protocol for processing network packets. For example, the network packet processor may implement a protocol layer of a communication protocol, and for a high-level packet received from a higher protocol layer and delivered to a lower protocol layer for eventual transmission on the communication media, the manipulations may encapsulate the high-level packet within a low-level packet of the lower protocol layer.

A protocol designer may develop a specification of the processing of network packets by a network packet processor. A hardware designer, such as an integrated circuit designer, may create a hardware implementation of a network packet processor that complies with the requirements specified by the protocol designer. Thus, development of a network packet processor implemented in hardware may require the specialized knowledge and skills of at least two separate fields of expertise. Because multiple fields of expertise may be required during development of a hardware implementation of a network packet processor, development of a network packet processor may be time consuming and expensive.

Rapid development of the protocol or implementation of a network packet processor may improve the timeliness and/or quality of the network packet processor. For example, if a hardware implementation can be generated quickly given a specification of the processing of network packets, deficiencies discovered in an initial implementation may be addressed by modifying the specification and generating an improved implementation. Additional iterations of improvement may be possible if the hardware implementation can be generated quickly from a protocol specification.

The present invention may address one or more of the above issues.

SUMMARY

An embodiment of a packet processor includes: a memory and a programmable compute pipeline. The memory stores microcode that specifies respective sets for the packet types, and the respective set for each type specifies elementary operations for each stage except an initial stage of the programmable compute pipeline. The programmable compute pipeline sequentially processes the packets. The programmable compute pipeline includes a sequence of stages beginning with the initial stage. The initial stage includes an operation selector that selects the respective set for the type of each packet. Each stage except the initial stage includes elementary components that are programmable to concurrently perform each of multiple combinations of elementary operations. The elementary components concurrently perform a selected one of the combinations for each packet. The selected combination includes the elementary operations specified for the stage in the respective set that the operation selector selects for the packet's type.

An embodiment of a method for programming a packet processor includes: generating a parsing tree from a specification describing the packet processor, the parsing tree having levels, a root node in an initial one of the levels for detecting each of the types of packets, each of the packets having a particular type that is one of the types, and for each level other than the initial level, the parsing tree specifies a concurrent set of elementary operations for each type. This embodiment of the method further includes associating each of the levels of the parsing tree with one stage of a sequence of stages of a programmable compute pipeline for sequentially processing the packets, the initial level associated with an initial stage of the stages in the sequence, each of the stages other than the initial stage including elementary components that are programmable to concurrently perform each combination of combinations of the elementary operations, and the elementary components are programmable to concurrently perform a selected one of the combinations for each of the packets, the selected combination including the elementary operations in the concurrent set for the particular type of the packet; for each of the types, associating each of the elementary operations in the concurrent set for the type in each of the levels other than the initial level with one of the elementary components in the stage that is associated with the level. This embodiment of the method further includes generating microcode that programs the programmable compute pipeline to process the packets, the microcode specifying respective sets for the types, the respective set for each of the types specifying the selected combination for each stage other than the initial stage, the selected combination for the stage specifying that each elementary component in the stage performs the elementary operation that is associated with the elementary component in the stage for each packet that has the particular type.

An embodiment of an article of manufacture includes a non-transitory computer-readable medium with an executable program stored thereon, where the program instructs a processor to perform the following: generate a parsing tree from a specification describing the packet processor, the parsing tree having levels, a root node in an initial one of the levels for detecting each type of packets, each of the packets having a particular type that is one of the types, and for each level other than the initial level, the parsing tree specifying a concurrent set of elementary operations for each type; associate each level of the parsing tree with one stage of a sequence of stages of a programmable compute pipeline for sequentially processing the packets, the initial level associated with an initial stage of the stages in the sequence, each of the stages other than the initial stage including elementary components that are programmable to concurrently perform each combination of combinations of the elementary operations, and the elementary components are programmable to concurrently perform a selected one of the combinations for each packet, the selected combination including the elementary operations in the concurrent set for the particular type of the packet. For each type, associate each of the elementary operations in the concurrent set for the type in the levels other than the initial level with one of the elementary components in the stage that is associated with the level; and generate microcode that programs the programmable compute pipeline to process the packets, the microcode specifying respective sets for the types, the respective set for each type specifying the selected combination for each stage other than the initial stage, the selected combination for the stage specifying that each elementary component in the stage performs the elementary operation that is associated with the elementary component for each packet that has the particular type.

BRIEF DESCRIPTION OF THE DRAWINGS

Various aspects and advantages of the invention will become apparent upon review of the following detailed description and upon reference to the drawings in which.

DETAILED DESCRIPTION OF THE DRAWINGS

Figure 1:
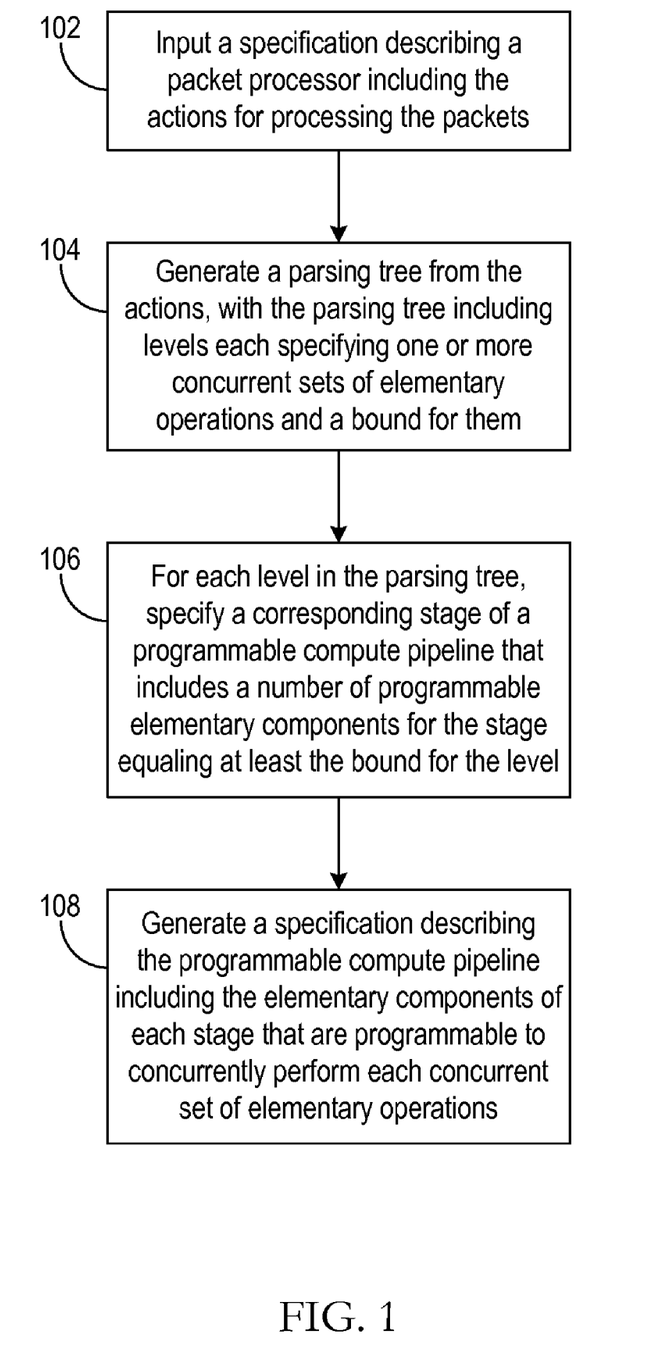
FIG. 1 is a flow diagram of a process for generating a programmable packet processor in accordance with one or more embodiments of the invention.

FIG. 1 is a flow diagram of a process for generating a programmable packet processor in accordance with one or more embodiments of the invention. A general-purpose processor is programmed to generate a parsing tree from a specification describing the packet processor and programmed to generate a programmable compute pipeline that implements the packet processor from a generalization of the parsing tree.

At block 102, a specification describing the packet processor is input. The specification describes actions for processing packets. In one embodiment, the specification describes the fields in each type of packet and for each type of packet the specification also describes actions that calculate one or more results from the fields of the packet.

At block 104, a parsing tree is generated from the actions in the specification of the packet processor. The parsing tree has multiple levels, and for each level the parsing tree specifies one or more concurrent sets of elementary operations. The elementary operations are simple operations that collectively implement the actions, and the elementary operations in each concurrent set can be calculated concurrently because they have no dependency on each other. In one embodiment, each level of the parsing tree specifies a concurrent set of elementary operations for each type of packet.

The parsing tree also specifies a bound for the elementary operations in each level of the parsing tree. The bound for a level is the number of elementary operations in the concurrent set of the level that has the largest number of elementary operations.

At block 106, the stages of the programmable compute pipeline are specified. Each stage corresponds to a level of the parsing tree and includes elementary components that are programmable to concurrently perform various combinations of elementary operations. These combinations of elementary operations include each current set of elementary operations specified in the corresponding level of the parsing tree. In one embodiment, each level of the parsing tree specifies a concurrent set of elementary operations for each type of packet, and the elementary components in each stage are programmed for each packet to concurrently perform the concurrent set of elementary operations for the type of the packet. In this embodiment, the number of elementary components in each stage equals the bound specified by the parsing tree for the corresponding level because as many components are needed as the number of elementary operations in the largest concurrent set.

In another embodiment, the number of elementary components in a particular stage exceeds the bound because, for example, no set of elementary components exists in which the elementary components are sufficiently programmable to concurrently perform every concurrent set of elementary operations for the corresponding level of the parsing tree. Instead, the elementary components of the particular level are selected to cover every concurrent set of elementary operations for the corresponding level of the parsing tree. Depending on the level of programmability of the available elementary components, the number of elementary components needed to cover every concurrent set can be slightly or significantly greater than the corresponding bound.

At block 108, the specification of the programmable compute pipeline is generated. The programmable compute pipeline is generally programmable to implement the specified actions for the packet processor and certain potential modifications of the specified actions. This permits implementing slightly, or possibly dramatically, modified actions in the same programmable compute pipeline simply by reprogramming the programmable compute pipeline. Thus, in one embodiment certain modifications of the actions can be quickly implemented without regenerating the programmable compute pipeline and while the programmable compute pipeline is actively processing packets.

In one embodiment, a user is notified when a particular modification of the actions is too extensive to be implemented in an existing programmable compute pipeline. The user can either regenerate the programmable compute pipeline by iterating the process of FIG. 1, or the user can check whether the existing programmable compute pipeline can implement an alternative modification of the actions.

Figure 2:
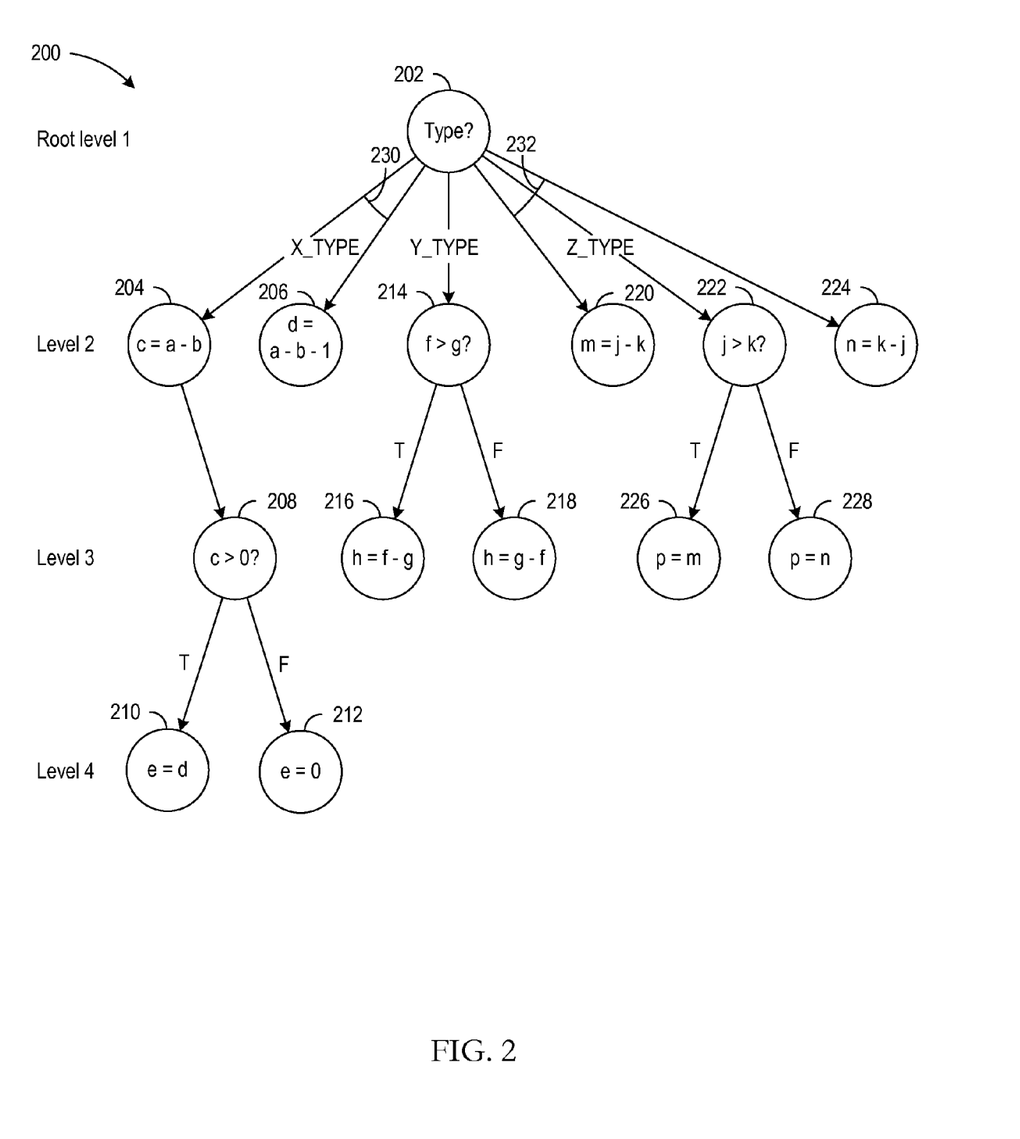
FIG. 2 is a graph diagram of an example parsing tree of an example packet processor in accordance with one or more embodiments of the invention.

FIG. 2 is a graph diagram of an example parsing tree 200 of an example packet processor in accordance with one or more embodiments of the invention. The parsing tree is generated from a specification of the actions of a packet processor. The actions are decomposed into elementary operations and arranged in the parsing tree to specify the dependencies between the elementary operations and to specify concurrency for sets of elementary operations lacking any dependency.

The example parsing tree has a root node 202 for detecting each type of the packets. The root node 202 is in an initial or root level of the parsing tree. For this example packet processor, the packets may be one of three types, type X_TYPE, type Y_TYPE, or type Z_TYPE. Because each packet has a particular type, the actions specified for each packet are those actions specified for processing the particular type of the packet. Frequently, each packet type has some fields that differ from the other packet types, and the actions access fields that are specific to the particular type of the packet.

For the packet processor having the example parsing tree shown in FIG. 2, Example 1 provides a specification of the actions for the three types of packets:

```
X_TYPE{
  .{a:4,
    b:4}
  e:5;
  e=((a>b)?(a−b−1):0;
}
Y_TYPE{
  .{f:8,
    g:8}
  h:8;
  h=(f>g)?(f−g):(g−h);
}
Z_TYPE{
  .{j:4,
    k:4}
  p:4;
  p=(j>k)?(j−k):(k−j);
}
```

Example 1

Specification of a Packet Processor

For each packet type, Example 1 specifies the fields of the type and the actions performed on packets having the type. For a packet with type X_TYPE, the actions calculate the result e that is field a minus field b minus one, unless this result would be negative and then the result e is zero. For a packet with type Y_TYPE, the actions calculate the eight-bit result h that is the absolute value of the difference between packet fields f and g. For a packet with type Z_TYPE, the actions calculate the four-bit result p that is the absolute value of the difference between packet fields j and k.

FIG. 2 is a graph diagram of an example parsing tree for the example packet processor of Example 1. The parsing tree has a subtree for each of the packet types. The subtree for type X_TYPE is rooted at the root node 202 and includes nodes 204 and 206 for the elementary operations in the second level of the parsing tree, node 208 for the elementary operation in the third level of the parsing tree, and nodes 210 and 212 for the elementary operations in the fourth level of the parsing tree. Similarly, the subtree for type Y_TYPE includes nodes 202, 214, 216, and 218; and the subtree for type Z_TYPE includes nodes 202, 220, 222, 224, 226, and 228.

The actions of the example packet processor of Example 1 could be divided into a variety of parsing trees. FIG. 2 shows one possibility of an example parsing tree for the example packet processor specified in Example 1. Note that an absolute value of a difference of fields is calculated for packets having either the Y_TYPE or the Z_TYPE in Example 1, but the corresponding subtrees for these types are very different in the example parsing tree of FIG. 2.

Node 202 corresponds to the elementary operation of detecting the type of the current packet. For a packet having type X_TYPE, nodes 204 and 206 calculate the elementary operations of respective subtractions producing intermediate results. Because there is no dependency between these subtractions, they can be performed concurrently. For a packet having type Y_TYPE, node 214 performs the elementary operation of comparing two fields of the packet. For a packet having type Z_TYPE, nodes 220 and 224 calculate the elementary operations of respective subtractions producing intermediate results, and node 222 performs the elementary operation of comparing two fields of the packet. Because there is no dependency between the elementary operations of nodes 220, 222, and 224, they can be performed concurrently.

Each packet has one of types X_TYPE, Y_TYPE, or Z_TYPE. Thus, for a packet processor that processes packets sequentially in one embodiment, the elementary operations of nodes 204 and 206 are never performed concurrently with the elementary operation of node 214 or the elementary operation of nodes 220, 222, and 224. Similarly, the elementary operation of node 214 is never performed concurrently with the elementary operation of nodes 220, 222, and 224 in this embodiment. Thus, the nodes 204 and 206 specify a concurrent set of elementary operations that is not concurrent with either the degenerate concurrent set of the single elementary operation of node 214 or the concurrent set of elementary operations of nodes 220, 222, and 224, and vice versa. Similarly, node 214 specifies the degenerate concurrent set that is not concurrent with the concurrent set of elementary operations of nodes 220, 222, and 224, and vice versa. The arcs 230 and 232 signify that nodes 204 and 206 specify a concurrent set and the nodes 220, 222, and 224 specify another concurrent set, and these concurrent sets are not concurrent with each other. The parsing tree has no corresponding arc for the concurrent set of the elementary operation of node 214 because this is a degenerate concurrent set.

The parsing tree specifies at least one concurrent set for each level other than the root or initial level at node 202. The second level includes a concurrent set for each type that includes the elementary operations in the second level of the subtree for the type. For example, the second level includes a concurrent set of the elementary operations for nodes 204 and 206 because these two nodes are in the second level of the subtree for type X_TYPE. The third level of the parsing tree also includes concurrent sets for the types. However, because node 214 specifies a comparison that is either true or false, the elementary operation of node 216 is never performed concurrently with the elementary operation of node 218 in an embodiment that sequentially processes packets. Thus, node 216 specifies a concurrent set of a single elementary operation and node 218 specifies another concurrent set of a single elementary operation, and these two concurrent sets are not concurrent with each other. Nodes 226 and 228 similarly specify respective concurrent sets. Thus, the third level includes five concurrent sets for each of nodes 208, 216, 218, 226, and 228. Similarly, the fourth level includes two concurrent sets for nodes 210 and 212.

The parsing tree also specifies a bound on the number of concurrent elementary operations in each level beside the root level. In one embodiment, the bound is a value of three for the second level because this is a maximum of the number of elementary operations in the concurrent sets of the level. Specifically, the second level has three concurrent sets with the concurrent set of nodes 204 and 206 enumerating two elementary operations for type X_TYPE, the concurrent set of node 214 enumerating one elementary operation for type Y_TYPE, and the concurrent set of nodes 220, 222, and 224 enumerating three elementary operations for type Z_TYPE. This results in the maximum number of elementary operations in the concurrent sets being a maximum of the respective values of two, one, and three for the types, and this maximum is the bound of three elementary operations. Similarly, the bound for the third level is one elementary operation and the bound for the fourth level is one elementary operation.

Figure 3:
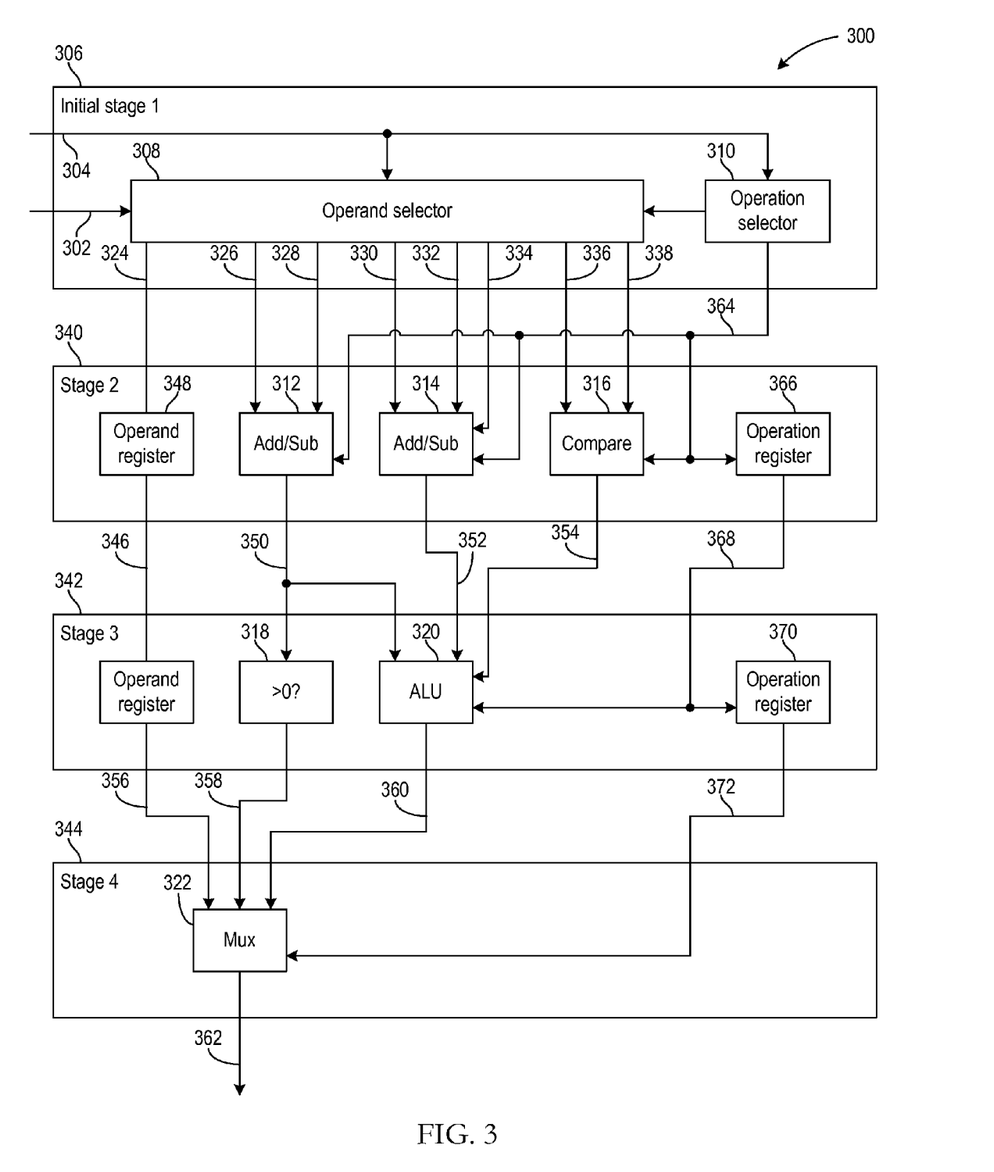
FIG. 3 is a block diagram of a programmable compute pipeline of an example packet processor in accordance with one or more embodiments of the invention.

FIG. 3 is a block diagram of a programmable compute pipeline 300 of an example packet processor in accordance with one or more embodiments of the invention. The programmable compute pipeline of FIG. 3 is one possible generalization for implementing the example parsing tree of FIG.

2, and the example parsing tree of FIG. 2 is one possible parsing tree for the example packet processor specified in Example 1.

The programmable compute pipeline inputs the packets on line 302. In one embodiment, the packet processor sequentially inputs the packets on line 302 and the corresponding type of each packet on line 304. The initial stage 306 of the compute pipeline corresponds to the root level of FIG. 2. The initial stage 306 includes an operand selector 308 that extracts the appropriate operands for the elementary operations from the packets and an operation selector 310 that programs the elementary components 312, 314, 316, 318, 320, and 322 to perform these elementary operations.

The parsing tree of FIG. 2 specifies elementary operations having the operands of fields a, b, f, g, j, and k from the three types of packets, and operand selector 308 is programmed to extract these fields and certain immediate values onto lines 324, 326, 328, 330, 332, 334, 336, and 338. The parsing tree of FIG. 2 also specifies elementary operations including subtractions, comparisons, and conditional result selection, and operation selector 310 programs the elementary components 312, 314, 316, 318, 320, and 322 to perform these elementary operations on the selected operands and certain intermediate results generated by the elementary components.

The operand selector 308 is programmable to extract portions of each packet onto some or all of lines 324, 326, 328, 330, 332, 334, 336, and 338. The portions are programmable with an offset into the packet, and the offset can vary with the type of the packet to specify any field in the type of each packet. Thus, with the appropriate offsets specified for each type of packet, the operand selector 308 extracts the fields a, b, f, g, j, and k needed to compute the elementary operations specified in the parsing tree of FIG. 2.

The operand selector 308 can also provide programmable immediate values on certain ones of lines 324, 326, 328, 330, 332, 334, 336, and 338. Each immediate value can be a fixed value or can vary with the type of the packet. The operand selector 308 combines the portions on lines 324, 326, 328, 330, 332, 334, 336, and 338, and this combination is an initial version of a data vector for the programmable compute pipeline.

Stages 340, 342, and 344 input a version of the data vector and output another version of the data vector. Stage 340 inputs the initial version of the data vector from operand selector 308 of the initial stage 306. Stage 340 passes the portion on line 324 to line 346 via operand register 348 and replaces the part of the initial data vector on lines 326, 328, 330, 332, 334, 336, and 338 with results on lines 350, 352, and 354. The results on lines 350, 352, and 354 are computed by elementary components 312, 314, and 316 from the part of the initial data vector. Similarly, stage 342 inputs the version of the data vector on lines 346, 350, 352, and 354 from the preceding stage 340, and stage 342 outputs another version of the data vector on lines 356, 358, and 360. Finally, stage 344 inputs the version of the data vector on lines 356, 358, and 360, and stage 344 outputs a result data vector on line 362. Thus, the operands and intermediate results flow through the stages 306, 340, 342, and 344 of the programmable compute pipeline. In one embodiment, the stages 306, 340, 342, and 344 each need a fixed number of clock cycles, such as one clock cycle, to compute the output version of the data vector from the input version of the data vector.

The operation selector 310 detects each packet type in correspondence with the root node 202 of FIG. 2 for detecting each packet type. For each packet type, the operation selector 310 programs the elementary components 312, 314, 316, 318, 320, and 322 to perform the appropriate elementary operations for the type of packet.

Second stage 340 of the programmable compute pipeline corresponds to the second level of the parsing tree of FIG. 2. The elementary components 312, 314, and 316 of stage 340 are programmable to perform the elementary operations of nodes 204, 206, 214, 220, 222, and 224 in the second level of the parsing tree of FIG. 2. Because the parsing tree specifies a bound of three elementary operations, stage 340 needs three or more elementary components to perform three elementary operations concurrently. The bounding concurrent set of elementary operations is the concurrent set for the three nodes 220, 222, and 224. Nodes 220, 222, and 224 specify that stage 340 needs to concurrently perform two subtractions and one comparison for each packet having type Z_TYPE. The elementary components 312, 314, and 316 are selected to generalize these required elementary operations. Thus, elementary components 312 and 314 are selected to add in addition to the required subtraction and the elementary component 316 is selected to perform various comparisons in addition to the required "greater than" comparison.

For packets of type Y_TYPE, the corresponding concurrent set in the second level of the parsing tree includes node 214 in FIG. 2. The selected elementary component 316 can perform the required comparison of node 214, so stage 340 already has sufficiently programmable elementary components 312, 314, and 316. For packets of type Z_TYPE, the selected elementary components 312 and 314 could perform the two required subtractions of nodes 204 and 206 of the corresponding concurrent set in the second level of the parsing tree, except that the subtraction of node 206 is a subtraction with a borrow input. Thus, elementary component 314 is further generalized to include a carry/borrow input on line 334 to make the elementary components 312, 314, and 316 sufficiently programmable to concurrently perform the elementary operations of nodes 204 and 206. The resulting elementary components 312, 314, and 316 are sufficiently programmable to perform the elementary operations of the second level of the parsing tree of FIG. 2 for each of the three packet types.

Third stage 342 of the programmable compute pipeline corresponds to the third level of the parsing tree including nodes 208, 216, 218, 226, and 228 of FIG. 2. The bound for the third level is one elementary operation and the required elementary operations are the comparison of node 208, the subtractions of nodes 216 and 218, and the conditional result selections of nodes 226 and 228. In one embodiment, a library of elementary components includes an arithmetic and logic unit (ALU) that is programmable with a three-bit microcode instruction to perform one of eight elementary operations as shown in Example 2:

pass operand1 or operand2 as selected by operand3
    operand 1 plus operand2 plus carry-in of operand3
    operand1 minus operand1 minus borrow-in of operand3
    sign of operand3 times result of operand1 minus operand2
    bitwise AND of operand1 and operand 2
    bitwise OR of operand1 and operand 2
    bitwise exclusive OR of operand1 and operand 2
    operand1 shifted by operand2 bits in direction of operand3

Example 2

Elementary Operations Performed by an ALU

This ALU is sufficiently programmable to perform the elementary operations of nodes 216, 218, 226, and 228 of FIG. 2 as discussed below in connection with FIG. 4. The operand on line 352 is "operand1," the operand on line 350 is "operand2," and the operand on line 354 is "operand3." However, this ALU cannot also perform the comparison of node 208. Thus, after selecting this ALU for elementary component 320 of stage 342, another elementary component 318 is selected to perform the comparison of node 208. However, elementary component 318 is not programmable in this example, but could be chosen to be programmable. Third stage 342 includes two elementary components in this example even though the bound for the third level of the parsing tree is one.

Fourth stage 344 includes the elementary component 322 that is a multiplexer for performing the conditional result selection of nodes 210 and 212. This multiplexer produces the result data vector on line 362 for all packet types.

The elementary components 312, 314, 316, 318, 320, and 322 of stages 340, 342, and 344 are selected to implement the parsing tree of FIG. 2 and to be programmable to generalize the elementary operations in the parsing tree. Thus, the compute pipeline is programmable to implement the parsing tree of FIG. 2 and additional parsing trees, such as parsing trees resulting from minor and possibly major modifications of the parsing tree of FIG. 2. This permits quick updating of the programmable compute pipeline.

In one embodiment, the operation selector 310 independently programs the elementary components 312, 314, 316, 318, 320, and 322 to perform elementary operations for the type of each packet. Because of this, the elementary components 312, 314, 316, 318, 320, and 322 are collectively programmable to perform combinations of elementary operations that include every combination of each possible elementary operation that each elementary component can individually be programmed to perform. Furthermore, the elementary components 312, 314, 316, 318, 320, and 322 can be programmed to perform any such combination of elementary operations for each type of packet.

Operation selector 310 produces an operation vector on line 364 that directly programs the elementary components 312, 314, and 316 of the second stage 340. Operation register 366 and operand register 348 match the latency of elementary components 312, 314, and 316 of the second stage 340, such that the operation vector on line 368 and the data vector on lines 346, 350, 352, and 354 are presented to third stage 342 with synchronized timing. Second stage 2 extracts a specification of the elementary operations performed by elementary components 312, 314, and 316 from the operation vector on line 364, and operation register 346 stores the operation vector on line 364 after removing this specification of the elementary operations performed by elementary components 312, 314, and 316. Thus, the operation vector on line 368 includes the specification of the elementary operations performed by the programmable elementary components 320 and 322 in the subsequent stages 342 and 344 of the programmable compute pipeline (elementary component 318 is not programmable in this example). Similarly, operation register 370 outputs a version of the operation vector on line 372 that removes a specification of the elementary operation performed by elementary component 320 from the version of the operation vector on line 368.

Figure 4:
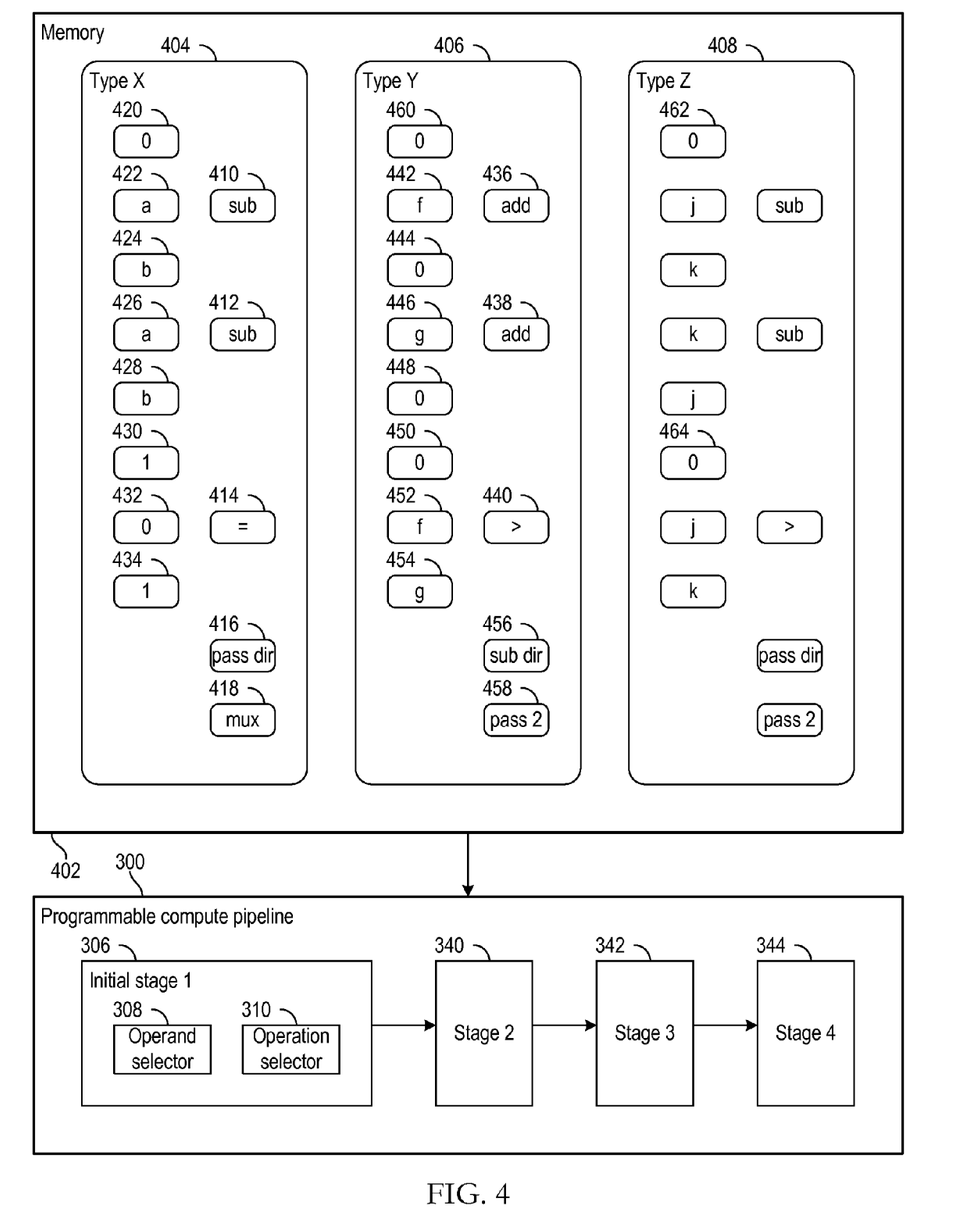
FIG. 4 is a block diagram of a compute pipeline of an example packet processor that is programmed in accordance with one or more embodiments of the invention.

FIG. 4 is a block diagram of a compute pipeline of an example packet processor that is programmed in accordance with one or more embodiments of the invention. The microcode in memory 402 programs the programmable compute pipeline 300 (FIG. 4, shows a simplified depiction of the programmable compute pipeline 300 of FIG. 3) to implement the parsing tree of FIG. 2.

The programmable compute pipeline of FIG. 3 is generated from the parsing tree of FIG. 2, and the microcode in memory 402 is generated from both the parsing tree of FIG. 2 and a specification of the programmable compute pipeline of FIG. 3. In one embodiment, the microcode in memory 402 is generated from a parsing tree that is a modification of the parsing tree used to generate the programmable compute pipeline 300.

The memory 402 stores microcode including respective sets 404, 406, and 408 for the three packet types X_TYPE, Y_TYPE, or Z_TYPE. The set 404 includes specifications 410, 412, 414, 416, and 418 of elementary operations for the elementary components of the programmable compute pipeline. The set 404 also includes specifications 420, 422, 424, 426, 428, 430, 432, and 434 of operands for an initial data vector. The operation selector 310 and/or the operand selector 308 selects the respective set 404 from the microcode when the packet type (received on line 304 of FIG. 3 in one embodiment) is the type X_TYPE.

The combination of elementary operations of specifications 410, 412, and 414 respectively program elementary components 312, 314, and 316 to concurrently perform a subtraction, a subtraction with borrow, and equality comparison. The specification 410 programs elementary component 312 to perform a subtraction of the operands on lines 326 and 328, and specifications 422 and 424 cause operations selector 308 to respectively place fields a and b on these lines 326 and 328. The specification 412 programs elementary component 314 to perform a subtraction between field a of specification 426 and field b of specification 428 with the borrow of an immediate value of one from specification 430. The specification 414 programs elementary component 316 to check for equality of the differing immediate values of specifications 432 and 434.

Similarly, specification 416 programs ALU elementary component 320 to pass the result on line 352 that is selected by the false condition on line 354. Specification 418 programs elementary component 322 to perform a multiplexing operation, and the multiplexing operation selects the result on line 360 when the condition on line 358 is true and the immediate value of zero from specification 420 when the condition is false. In summary, set 404 programs the programmable compute pipeline 300 to perform the elementary operations in the subtree for type X_TYPE in the parsing tree of FIG. 2.

For packets of type Y_TYPE, the combination of elementary operations of specifications 436, 438, and 440 programs the elementary components of the second stage 340. The second stage 340 adds field f of specification 442 to the immediate value of zero of specification 444, adds field g of specification 446 to the immediate value of zero of specification 448 with a borrow of zero of specification 450, and compares field f of specification 452 and field g of specification 454. Note fields f and g are effectively passed unmodified to lines 350 and 352. Specification 456 programs ALU elementary component 320 to perform a subtraction between fields f and g passed onto lines 350 and 352, with the direction of the subtraction specified by the result on line 354 from the comparison of these two fields. Thus, ALU elementary component 320 generates the absolute value of the difference of fields f and g on line 360, and specification 458 programs elementary component 322 to unconditionally pass this result to the result data vector on line 362.

For packets of type Z_TYPE, set 408 similarly programs the programmable compute pipeline 300 to calculate the absolute value of the difference between fields j and k.

Because specifications 420, 460, and 462 all specify the same immediate value of zero in this example, the operand on line 324 is programmed to have a constant value regardless of the type of the packet. In contrast, for specifications 430, 450 and 464 the operand on line 334 is programmed to have a value that varies as a function of the type of each packet.

The sets 404, 406, and 408 can be modified in memory 402 to program the compute pipeline 300 to implement different actions for manipulating the packets. In one embodiment, the memory 402 has storage space for additional sets, enabling programmable compute pipeline 300 to begin processing more types of packets during active packet processing by simply storing new operand and operation specifications in a new set in the appropriate region of memory 402. Fixed indexing or programmable indexing using an associative memory or block of comparators in the operand selector 308 can map from the packet type to the updated region in the memory 402.

Figure 5:
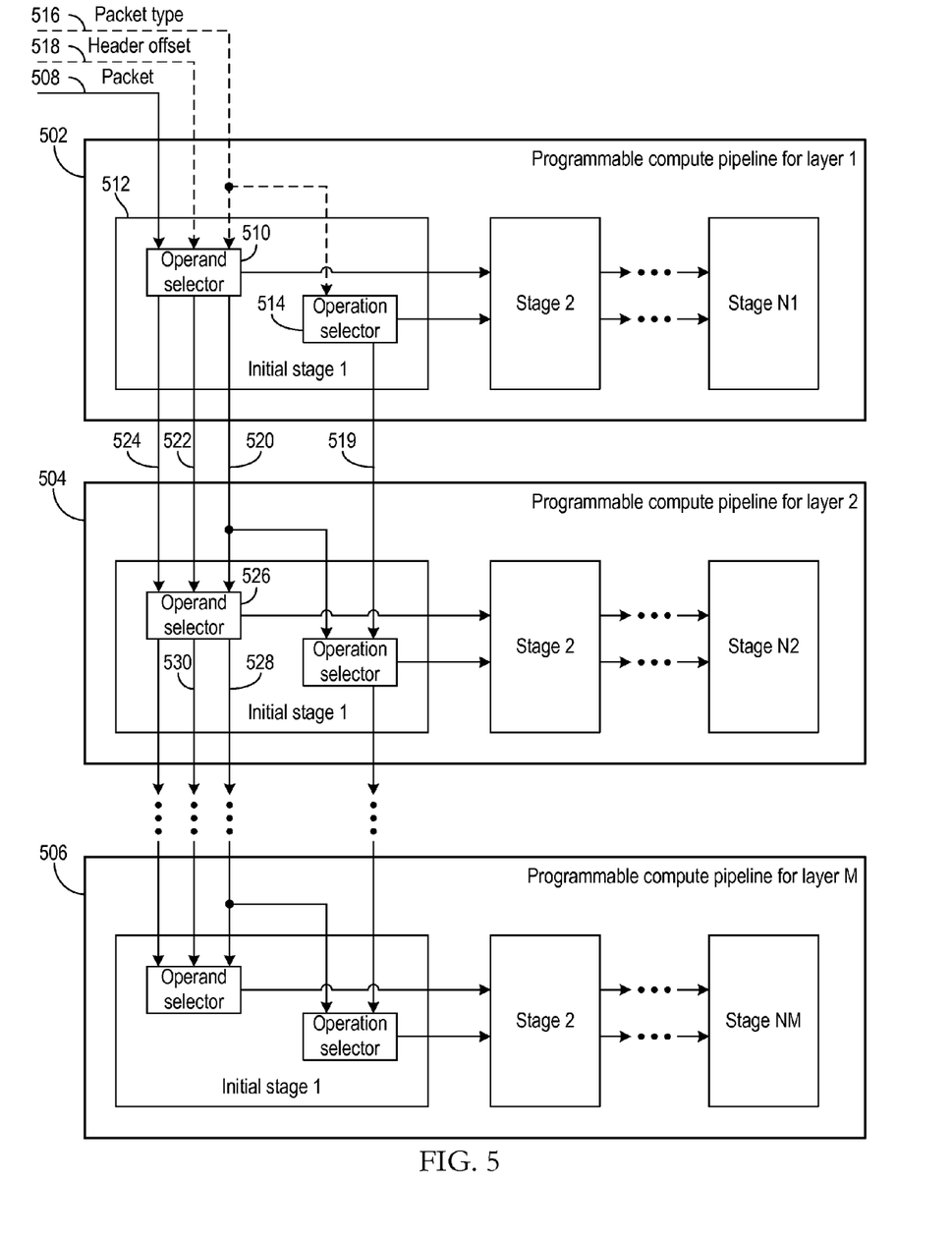
FIG. 5 is a block diagram of a programmable protocol pipeline including programmable compute pipelines of a packet processor in accordance with one or more embodiments of the invention.

FIG. 5 is a block diagram of a programmable protocol pipeline including programmable compute pipelines of a packet processor in accordance with one or more embodiments of the invention. The programmable protocol pipeline includes a programmable compute pipeline 502, 504, and 506 for each layer in a communication protocol. Each of the programmable compute pipelines 502, 504, and 506 is generated from a parsing tree that is generated from actions specified for the corresponding protocol layer in a specification of a packet processor.

The programmable protocol pipeline receives the packets on line 508 and the packets flow sequentially through the compute pipelines 502, 504, and 506 of the programmable protocol pipeline.

The operand selector 510 of the initial stage 512 of the first programmable pipeline 502 selects the needed operands for the first layer of the communication protocol. The operation selector 514 selects the appropriate operations for the type of each packet. In one embodiment, the packets all have a fixed type for the first layer, and the packet type and offset on lines 516 and 518 are unneeded. In another embodiment, the operand selector 510 and/or the operation selector 514 receive the packet type on line 516 and an offset of the header for this packet type on line 518. The offset of the header on line 518 is also optional when the header for the first layer begins at a fixed offset in the packet, such as at the beginning of the packet. In one embodiment, the operation selector 514 or the operand selector 510 generates an error indication on line 519 when the type of the packet is not recognized.

The operand selector 510 of the first programmable pipeline 502 also provides a type on line 520 and an offset on line 522 to the programmable compute pipeline 504 implementing the second layer of the communication protocol. The programmable compute pipeline 502 inputs each packet on line 508 and forwards the packet on line 524. In one embodiment, each packet includes a header for the first layer followed by a data payload that encapsulates a frame for the second layer. The frame of the second layer similarly includes a second header for the second layer and a data payload that encapsulates a frame for the third layer, and so on. The first header begins at the beginning of the packet or at the offset on line 518, and the operand selector 510 determines the offset of the second header on line 522 that is a sum of the offset of the first header and a size of the first header. The size of the first header is fixed for each type on line 516 or is variable for certain types depending on the type and a length field or fields in the header for the first protocol layer. The operand selector 510 is programmable to extract these length fields and to appropriately calculate the offset on line 522. Frequently, a field in the header of the first protocol layer specifies the type for the encapsulated frame of the second protocol layer, and the operand selector 510 is programmable to extract and output this type on line 520. It will be appreciated that multiple programmable compute pipelines 502, 504, and 506 can process the same packet type when the layers of the communication protocol repeat packet types.

The operand selector 526 of the programmable compute pipeline 504 for the second layer is similarly programmed to determine the type on line 528 of each packet and the offset on line 530 of the header for the third protocol layer.

Figure 6:
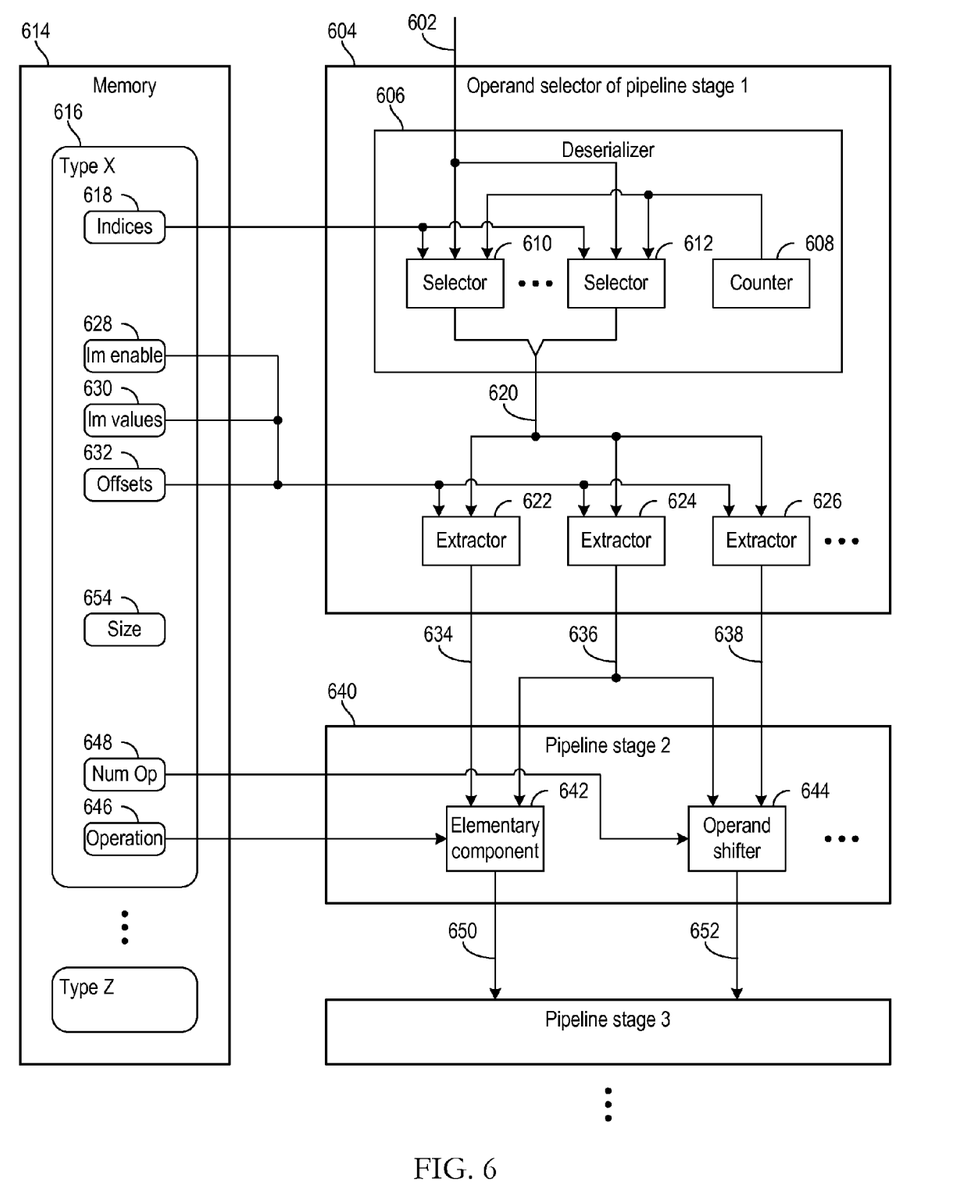
FIG. 6 is a block diagram illustrating programming of operand and operation selectors of a programmable compute pipeline in accordance with one or more embodiments of the invention.

FIG. 6 is a block diagram illustrating programming of operand and operation selectors of a programmable compute pipeline in accordance with one or more embodiments of the invention.

The programmable compute pipeline serially receives the packets on line 602, and for each packet the programmable compute pipeline receives the packet on line 602 as a series of words. The programmable compute pipeline has an initial stage that includes the operand selector 604. The operand selector 604 includes a deserializer 606 that includes a counter 608 and selectors 610 through 612. The memory 614 stores a microcode set 616 for a particular packet type, and the set 616 includes indices 618 for the selectors 610 through 612. The counter 608 counts the words in each packet received on line 602, and each selector 610 through 612 extracts the word in each packet at which the count in counter 608 matches the programmed index for the selector in indices 618. The extracted words for each packet are provided as a parallel vector on line 620 to the extractors 622 and 624 through 626.

The extractors 622 and 624 through 626 are each programmable to extract portions from the parallel vector on line 620 and/or to produce an immediate value. The microcode set 616 in memory 614 includes immediate enables 628, immediate values 630, and offsets 632 for the extractors 622 and 624 through 626. If the immediate enable in enables 628 for extractor 622 specifies producing an immediate value, then extractor 622 outputs the corresponding immediate value from immediate values 630. Otherwise when the appropriate immediate enable does not specify producing an immediate value, extractor 622 extracts a portion of the parallel vector 620 at the offset for extractor 622 in offsets 632. In one embodiment, extractor 622 includes a barrel shifter for shifting the parallel vector 620 by a shift amount specified by the appropriate offset from offsets 632, and the extracted portion is a programmable packet field.

In one embodiment, extractor 622 is programmable to selectively either extract a programmable portion of the parallel vector on line 620 or produce an immediate value, extractor 624 can only extract a programmable portion of the parallel vector on line 620, and extractor 626 can only produce an immediate value.

The operand selector combines the portions from 622 and 624 through 626 into the initial data vector on lines 634, 636, and 638.

The second stage 640 of the programmable compute pipeline includes an elementary component 642 and an operand shifter 644. Elementary component 642 is programmable to perform either a unitary elementary operation on one operand value or a binary elementary operation on two operand values. The microcode set 616 for a particular type in memory 614 includes operation specification 646 that programs the elementary operation, and set 616 includes a specification 648 of the number of operands processed by elementary component 642. When the elementary component 642 is programmed to process two operands, elementary component 642 replaces the two operands on lines 634 and 636 with a result on line 650, and operand shifter 644 is generally programmed to forward only the operand on line 638 to line 652. When the elementary component 642 is programmed to process one operand, elementary component 642 replaces the single operand on line 634 with a result on line 650, and operand shifter 644 is generally programmed to forward both the operands on lines 636 and 638 to line 652.

Thus, the various versions of the data vector for each stage of the programmable compute pipeline act as a stack of operands. The elementary components of each stage pop the appropriate number of operands off the top of the stack in some order, such as the order of the elementary components in the stage from left to right, and the elementary components of the stage push results onto the stack in the reverse order. This simplifies the routing of results from one stage to the operands of the succeeding stage.

In one embodiment, the size of the packet header is fixed for each type and specification 654 specifies the size of the packet header for determining the offset of the next header in the packet.

Figure 7:
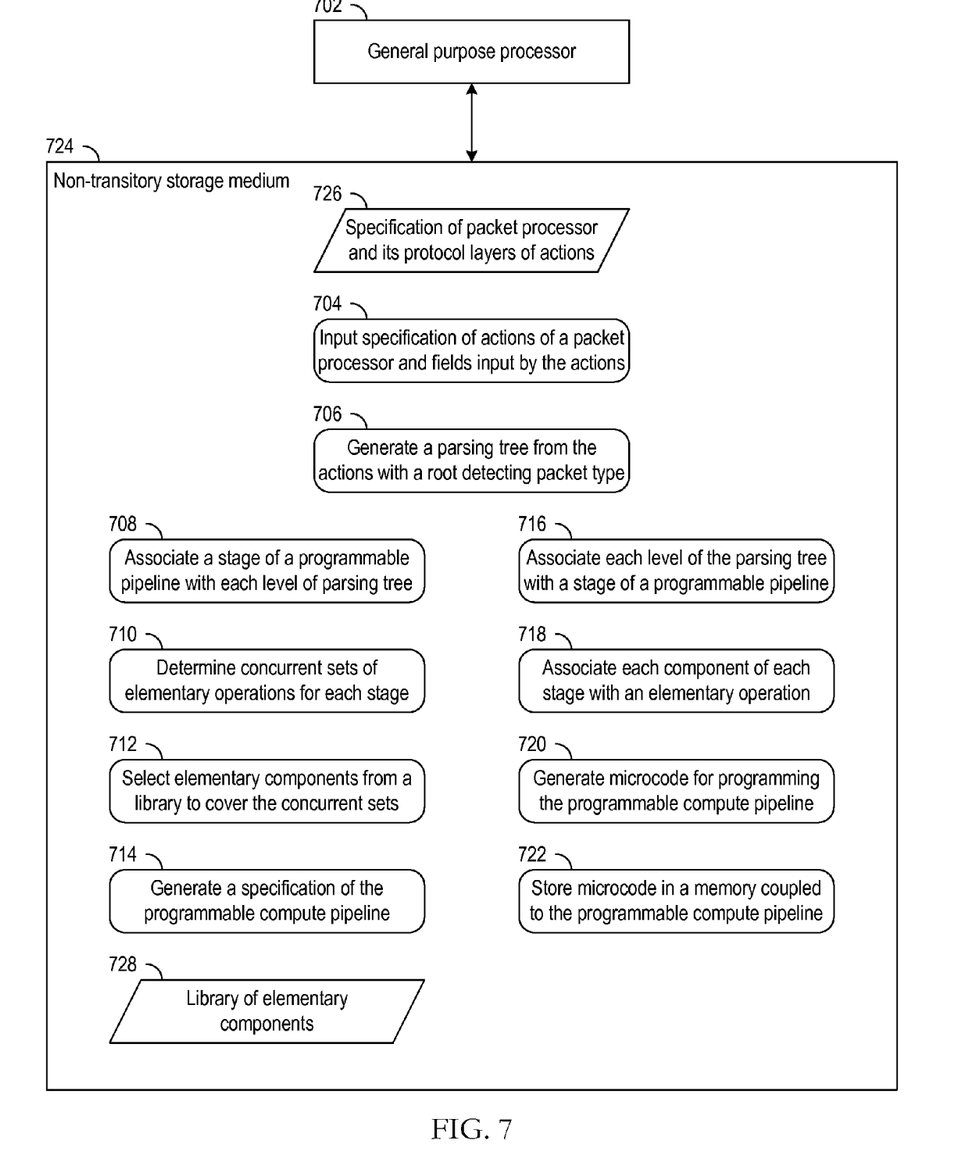
FIG. 7 is a block diagram of a system for generating and programming a programmable compute pipeline in accordance with one or more embodiments of the invention.

FIG. 7 is a block diagram of a system for generating and programming a programmable compute pipeline in accordance with one or more embodiments of the invention. A general purpose processor 702 is configured to execute instructions in software modules 704, 706, 708, 710, 712, 714, 716, 718, 720, 722 that are stored in non-transitory storage medium 724, and these instructions cause general purpose processor 702 to perform operations that generate and program the programmable compute pipeline.

The instructions in software module 704 cause processor 702 to input a specification describing the packet processor. In one embodiment, storage medium 724 also stores a specification 726 that describes a packet processor for a communication protocol with multiple layers. For each of the protocol layers, the specification describes actions for implementing the protocol layer and the packet fields that these actions input.

The instructions in software module 706 cause processor 702 to generate a parsing tree from the specification 726. The generated parsing tree has multiple levels and a root node in an initial level detects each of the packet types in one embodiment. The parsing tree specifies elementary operations that implement the specified actions. The parsing tree also specifies dependencies between the elementary operations.

The instructions in software module 708 cause processor 702 to associate a stage of the programmable compute pipeline with each level of the parsing tree. The programmable compute pipeline generally has a number of stages equaling the number of levels in the parsing tree. An initial stage in the programmable compute pipeline is associated with the initial level of the parsing tree. In one embodiment, the initial stage includes an operand selector that extracts a data vector from each packet, and the data vector is programmable to include the packet fields input by the actions. In this embodiment, the initial stage also includes an operation selector that selects a microcode set for programming the elementary components in every stage except the initial stage.

The instructions in software module 710 cause processor 702 to determine one or more concurrent sets of elementary operations for each stage other than the initial stage. The elementary operations in a level of the parsing tree form a concurrent set unless software module 710 causes processor 702 to determine that certain sets of the elementary operations in the level cannot be performed concurrently. For example, when one set from these elementary operations process one packet type and another set from these elementary operations process another packet type, these two sets cannot be performed concurrently and they are separate concurrent sets. The concurrent sets for each stage specify a bound on the elementary operations that need to be performed concurrently.

The instructions in software module 712 cause processor 702 to select the elementary components in each stage from a library. In one embodiment, storage medium 724 also stores the library 728 of possible elementary components. Generally, many elementary components can be programmed to perform each elementary operation, and the elementary components for each stage are selected to cover each concurrent set of elementary operations for the stage. Thus, the selected elementary components can be programmed to concurrently perform each concurrent set of elementary operations. In one embodiment, software module 712 causes processor 702 to initially attempt to select a number of elementary components equaling the bound on concurrently performed elementary operations. This frequently results in selected elementary components that are sufficiently programmable to implement specification 726, minor modifications of specification 726, and certain unrelated specifications. In one embodiment, the elementary components in library 728 have parameters, such as operand bit width, and selecting the elementary components includes specifying these parameters.

The instructions in software module 714 cause processor 702 to generate the specification of the programmable compute pipeline.

The instructions in software module 716 cause processor 702 to associate each level of the parsing tree with a stage of the programmable compute pipeline. While software module 708 causes association of levels with stages during generation of the programmable compute pipeline, software module 716 instead causes the reverse association of stages of an existing programmable compute pipeline with levels during programming of the existing programmable compute pipeline. Software module 716 is unneeded when the same specification 726 is used for both generating a programmable compute pipeline and programming this programmable compute pipeline.

The instructions in software module 718 cause processor 702 to associate the elementary operations in each concurrent set of a level with a respective one of the elementary components in the stage associated with the level. For each concurrent set of each level, this associates an elementary operation with each elementary component of the associated stage.

The instructions in software module 720 cause processor 702 to generate microcode for programming the programmable compute pipeline to implement the actions of specification 726. The elementary components of each stage are programmable to implement the actions by concurrently performing various combinations of elementary operations. In one embodiment, the elementary components in each stage are programmed to concurrently perform a selected combination of the associated elementary operations for each packet type. The microcode includes a respective set of specifications of the programmed elementary operations for each packet type, and the respective set includes the stages' selected combinations for the packet type.

The instructions in software module 722 cause processor 702 to store the microcode in a memory coupled to the programmable compute pipeline. This causes the programmable compute pipeline to implement the actions of specification 726 during sequential processing of the packets.

Figure 8:
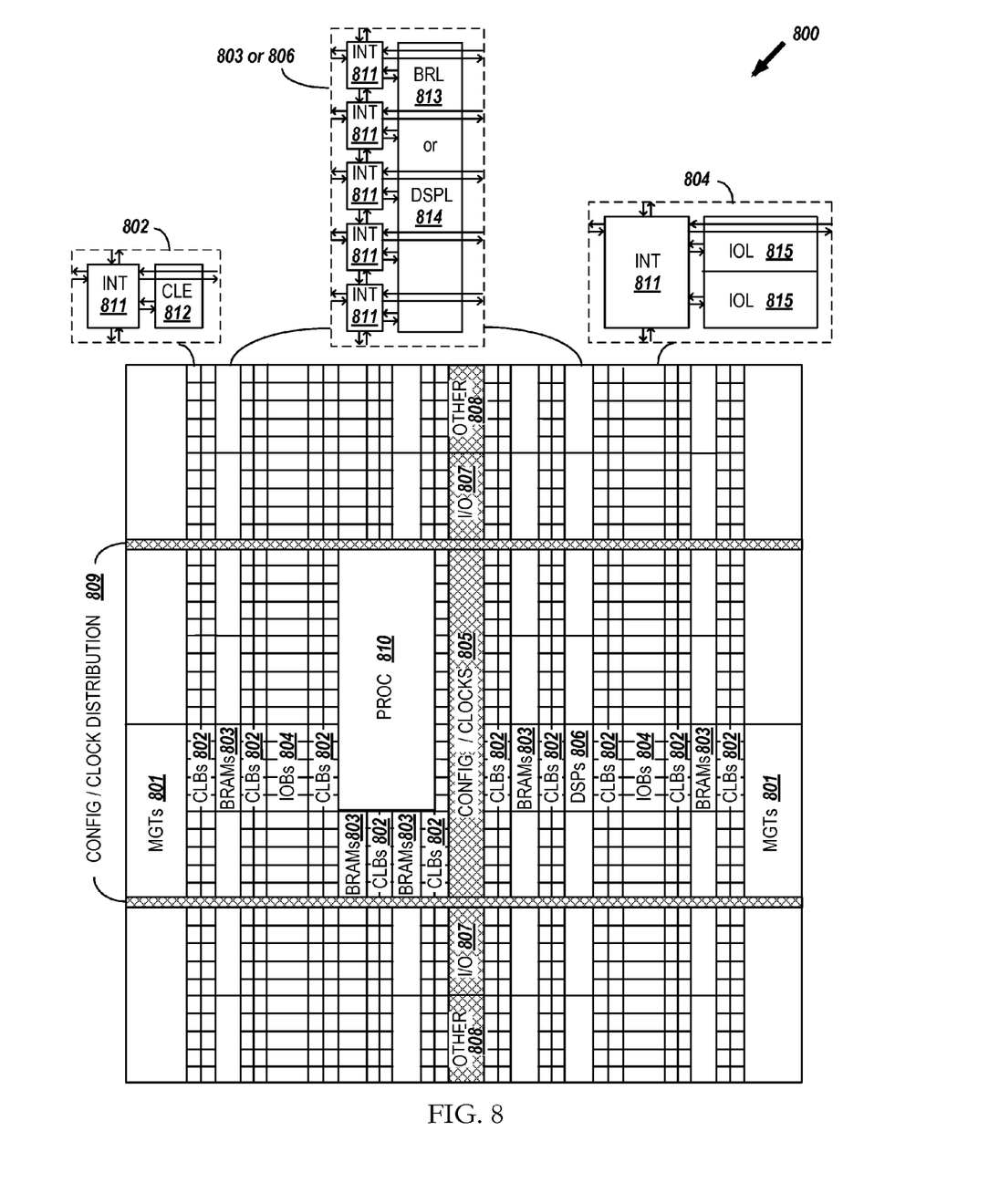
FIG. 8 is a block diagram of a programmable integrated circuit for implementing a programmable packet processor in accordance with one or more embodiments of the invention.

FIG. 8 is a block diagram of a programmable integrated circuit for implementing a programmable packet processor in accordance with one or more embodiments of the invention.

Programmable integrated circuits can include several different types of programmable logic blocks in the array. For example, FIG. 8 illustrates an FPGA architecture 800 that includes a large number of different programmable tiles including multi-gigabit transceivers (MGTs) 801, configurable logic blocks (CLBs) 802, random access memory blocks (BRAMs) 803, input/output blocks (IOBs) 804, configuration and clocking logic (CONFIG/CLOCKS) 805, digital signal processing blocks (DSPs) 806, specialized input/output blocks (I/O) 807, for example, e.g., clock ports, and other programmable logic 808 such as digital clock managers, analog-to-digital converters, system monitoring logic, and so forth. Some FPGAs also include dedicated processor blocks (PROC) 810 and internal and external reconfiguration ports (not shown).

In some FPGAs, each programmable tile includes a programmable interconnect element (INT) 811 having standardized connections to and from a corresponding interconnect element in each adjacent tile. Therefore, the programmable interconnect elements taken together implement the programmable interconnect structure for the illustrated FPGA. The programmable interconnect element INT 811 also includes the connections to and from the programmable logic element within the same tile, as shown by the examples included at the top of FIG. 8.

For example, a CLB 802 can include a configurable logic element CLE 812 that can be programmed to implement user logic plus a single programmable interconnect element INT 811. A BRAM 803 can include a BRAM logic element (BRL) 813 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 806 can include a DSP logic element (DSPL) 814 in addition to an appropriate number of programmable interconnect elements. An 10B 804 can include, for example, two instances of an input/output logic element (IOL) 815 in addition to one instance of the programmable interconnect element INT 811. As will be clear to those of skill in the art, the actual I/O pads connected, for example, to the I/O logic element 815 are manufactured using metal layered above the various illustrated logic blocks, and typically are not confined to the area of the input/output logic element 815.

In the pictured embodiment, a columnar area near the center of the die (shown shaded in FIG. 8) is used for configuration, clock, and other control logic. Horizontal areas 809 extending from this column are used to distribute the clocks and configuration signals across the breadth of the FPGA.

Some FPGAs utilizing the architecture illustrated in FIG. 8 include additional logic blocks that disrupt the regular columnar structure making up a large part of the FPGA. The additional logic blocks can be programmable blocks and/or dedicated logic. For example, the processor block PROC 810 shown in FIG. 8 spans several columns of CLBs and BRAMs.

Note that FIG. 8 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 8 are purely exemplary. For example, in an actual FPGA more than one adjacent column of CLBs is typically included wherever the CLBs appear, to facilitate the efficient implementation of user logic.

The embodiments of the present invention are thought to be applicable to a variety of packet processors. Other aspects and embodiments will be apparent to those skilled in the art from consideration of the specification and practice of the invention disclosed herein. The embodiments may be implemented as one or more processors configured to execute software, as an application specific integrated circuit (ASIC), or as a logic on a programmable logic device. It is intended that the specification and illustrated embodiments be considered as examples only, with a true scope and spirit of the invention being indicated by the following claims.

What is claimed is:

1. A packet processor, comprising:
a memory storing microcode that specifies respective sets for a plurality of types of a plurality of packets, each of the packets having a type of the plurality of types, and the respective set for each type specifies a plurality of elementary operations for each of a plurality of stages other than an initial stage of the plurality of stages; and
a programmable compute pipeline coupled to the memory for sequentially processing the plurality of packets, wherein:
  the programmable compute pipeline includes a sequence of the plurality of stages, and the sequence begins with the initial stage;
  the initial stage includes an operation selector that selects the respective set for the type of each of the plurality of packets; and
  each stage of the plurality of stages other than the initial stage includes a plurality of elementary components that are programmable to concurrently perform each of a plurality of combinations of the plurality of elementary operations, and the plurality of elementary components concurrently perform a selected one of the plurality of combinations for each of the plurality of packets, the selected combination including the plurality of elementary operations specified for the stage in the respective set that the operation selector selects for the type of the packet;
wherein the programmable compute pipeline is one of a plurality of programmable compute pipelines arranged in a programmable protocol pipeline for a plurality of protocol layers, and for each first and successive second one of the programmable compute pipelines in the programmable protocol pipeline, the first programmable compute pipeline is programmable to determine a second offset from a first offset and provide the second offset to the second programmable compute pipeline.

2. The packet processor of claim 1, wherein:
the memory stores the microcode specifying for each type of the plurality of types, the respective set that specifies at least one of a plurality of fields of the type;
the initial stage of the programmable compute pipeline further includes an operand selector that extracts a data vector from each of the plurality of packets, and the operand selector is programmable to extract the data vector that includes the at least one field specified in the respective set that the operation selector selects for the type of the packet;
each stage other than the initial stage inputs a first version of the data vector and each stage outputs a second version of the data vector, each stage other than the initial stage generating the second version of the data vector that replaces a part of the first version of the data vector with at least one result that the stage computes from the part; and
for the initial stage the second version is the data vector from the operand selector, and for each stage other than the initial stage the first version is the second version from a preceding stage of the plurality of stages in the programmable compute pipeline.

3. The packet processor of claim 1, wherein:
a first header has the first offset in the plurality of packets and a second header has the second offset in the plurality of packets, the first header for a first one of the protocol layers and the second header for a second one of the protocol layers.

4. The packet processor of claim 3, wherein the first programmable compute pipeline is programmable to extract a type identifying the second protocol layer from the first header of each packet and the first programmable compute pipeline provides the packet together with the type and the second offset to the second programmable compute pipeline.

5. The packet processor of claim 1, wherein:
the operation selector of the initial stage generates an operation vector from the respective set for the type of each of the plurality of packets;
each stage other than the initial stage inputs a first version of the operation vector and each stage outputs a second version of the operation vector;
each stage other than the initial stage extracting, from the first version of the operation vector, a specification of the selected combination of the plurality of elementary operations specified for the stage in the respective set;
each stage other than the initial stage generating the second version of the operation vector that removes the specification from the first version of the operation vector; and
for the initial stage the second version is the operation vector from the operation selector, and for each stage other than the initial stage the first version is the second version from a preceding stage of the plurality of stages in the programmable compute pipeline.

6. The packet processor of claim 5, wherein the plurality of elementary components of the stage concurrently perform the selected combination of the plurality of elementary operations specified for the stage in response to the specification.

7. The packet processor of claim 1, wherein each one of the plurality of elementary components of each stage other than the initial stage is individually programmable to perform a respective plurality of elementary operations on the plurality of packets, and the plurality of elementary components of the stage are collectively programmable to concurrently perform the plurality of combinations that include every combination of one of the respective plurality of elementary operations for each of the plurality of elementary components.

8. The packet processor of claim 7, wherein the respective plurality of elementary operations for one of the plurality of elementary components in one of the plurality of stages differs from the respective plurality of elementary operations for another one of the plurality of elementary components in the stage.

9. The packet processor of claim 7, wherein the memory stores the microcode that programs each of the plurality of elementary components of each stage other than the initial stage to perform one of the respective plurality of elementary operations on each of the plurality of packets, and the respective set for the type of the packet specifies the respective elementary operation that the elementary component performs.

10. The packet processor of claim 9, wherein the operation selector of the initial stage selects the respective set in response to the type of each of the plurality of packets, and the respective set includes a combination for each stage other than the initial stage and the combination is the one of the respective plurality of elementary operations for each elementary component in the stage.

11. The packet processor of claim 10, wherein the memory stores the microcode that programs each of the plurality of elementary components of each stage other than the initial stage to perform a first one of the respective plurality of elementary operations on the plurality of packets having a first one of the types and a second one of the respective plurality of elementary operations on the plurality of packets having a second one of the types, and the first and second elementary operations differ.

12. The packet processor of claim 1, wherein one of the plurality of elementary components of each stage other than the initial stage is individually programmable to perform a plurality of elementary operations on the plurality of packets, and the plurality of elementary components of the stage are collectively programmable to concurrently perform the plurality of combinations that include at least one respective combination for each of the plurality of elementary operations the elementary component is individually programmable to perform.

13. The packet processor of claim 1, wherein, for each of the plurality of packets, each of the plurality of elementary components of each stage other than the initial stage performs one of the plurality of elementary operations on the packet.

14. The packet processor of claim 13, wherein, for each of the plurality of packets, the plurality of elementary components of each stage other than the initial stage concurrently perform the combination that includes the one of the plurality of elementary operations performed on the packet by all of the plurality of elementary components of the stage.

15. The packet processor of claim 14, wherein, one of the plurality of elementary components of each stage other than the initial stage is individually programmable to perform a plurality of elementary operations that include the one of the plurality of elementary operations performed on each of the plurality of packets.

16. The packet processor of claim 15, wherein the memory stores the microcode that programs each of the plurality of elementary components of each stage other than the initial stage to perform a first one of the plurality of elementary operations on the plurality of packets having a first one of the types and a second one of the plurality of elementary operations on the plurality of packets having a second one of the types, and the first and second elementary operations differ.

17. A method for programming a packet processor, comprising:
generating a parsing tree from a specification describing the packet processor, the parsing tree having a plurality of levels, a root node in an initial one of the plurality of levels for detecting each of a plurality of types of a plurality of packets, each of the plurality of packets having a particular type of the plurality of types, and for each level other than the initial level, the parsing tree specifying a concurrent set of elementary operations for each of the plurality of types;
associating each of the plurality of levels of the parsing tree with one stage of a sequence of stages of a programmable compute pipeline for sequentially processing the plurality of packets, wherein the programmable compute pipeline is one of a plurality of programmable compute pipelines arranged in a programmable protocol pipeline for a plurality of protocol layers, and for each first and successive second one of the programmable compute pipelines in the programmable protocol pipeline, the first programmable compute pipeline is programmable to determine a second offset from a first offset and provide the second offset to the second programmable compute pipeline, the initial level associated with an initial stage of the stages in the sequence, each of the stages other than the initial stage including a plurality of elementary components that are programmable to concurrently perform each combination of a plurality of combinations of the elementary operations, and the plurality of elementary components are programmable to concurrently perform a selected one of the plurality of combinations for each packet of the plurality of packets, the selected combination including the elementary operations in the concurrent set for the particular type of the packet;

for each of the plurality of types, associating each of the elementary operations in the concurrent set for the type in each of the plurality of levels other than the initial level with one of the plurality of elementary components in the stage that is associated with the level; and generating microcode that programs the programmable compute pipeline to process the plurality of packets, the microcode specifying a plurality of respective sets for the plurality of types, the respective set for each of the plurality of types specifying the selected combination for each stage other than the initial stage, the selected combination for the stage specifying that each elementary component in the stage performs the elementary operation that is associated with the elementary component in the stage for each packet that has the particular type.

18. The method of claim 17, further comprising storing the microcode in a memory, the programmable compute pipeline coupled to the memory for sequentially processing the plurality of packets in response to the microcode stored in the memory.

19. The method of claim 17, wherein:

the specification describing the packet processor describes a plurality of actions for processing the plurality of packets, and for each type of the plurality of types of the plurality of packets, the plurality of actions inputting at least one of a plurality of fields of the type; and the generating of the microcode specifying the respective set for each type includes generating the microcode that specifies for each type the respective set that specifies the at least one field of the type.

20. An article of manufacture, comprising:

a non-transitory computer-readable medium with an executable program stored thereon, wherein the program instructs a processor to perform the following:

generating a parsing tree from a specification describing the packet processor, the parsing tree having a plurality of levels, a root node in an initial one of the plurality of levels for detecting each of a plurality of types of a plurality of packets, each of the plurality of packets having a particular type of the plurality of types, and for each level other than the initial level, the parsing tree specifying a concurrent set of elementary operations for each of the plurality of types;

associating each of the plurality of levels of the parsing tree with one stage of a sequence of stages of a programmable compute pipeline for sequentially processing the plurality of packets, wherein the programmable compute pipeline is one of a plurality of programmable compute pipelines arranged in a programmable protocol pipeline for a plurality of protocol layers, and for each first and successive second one of the programmable compute pipelines in the programmable protocol pipeline, the first programmable compute pipeline is programmable to determine a second offset from a first offset and provide the second offset to the second programmable compute pipeline, the initial level associated with an initial stage of the stages in the sequence, each of the stages other than the initial stage including a plurality of elementary components that are programmable to concurrently perform each combination of a plurality of combinations of the elementary operations, and the plurality of elementary components are programmable to concurrently perform a selected one of the plurality of combinations for each packet of the plurality of packets, the selected combination including the elementary operations in the concurrent set for the particular type of the packet;

for each of the plurality of types, associating each of the elementary operations in the concurrent set for the type in each of the plurality of levels other than the initial level with one of the plurality of elementary components in the stage that is associated with the level; and generating microcode that programs the programmable compute pipeline to process the plurality of packets, the microcode specifying a plurality of respective sets for the plurality of types, the respective set for each of the plurality of types specifying the selected combination for each stage other than the initial stage, the selected combination for the stage specifying that each elementary component in the stage performs the elementary operation that is associated with the elementary component for each packet that has the particular type.

* * * * *